June 19, 1945.  G. HERZOG  2,378,408
METHOD AND APPARATUS FOR LOGGING BORE HOLES
Filed Sept. 30, 1942   2 Sheets-Sheet 1

GERHARD HERZOG
INVENTOR
BY
HIS ATTORNEY

June 19, 1945. G. HERZOG 2,378,408
METHOD AND APPARATUS FOR LOGGING BORE HOLES
Filed Sept. 30, 1942 2 Sheets-Sheet 2

GERHARD HERZOG
INVENTOR
BY
HIS ATTORNEY

Patented June 19, 1945

UNITED STATES PATENT OFFICE 2,378,408

METHOD AND APPARATUS FOR LOGGING BOREHOLES

Gerhard Herzog, Houston, Tex., assignor to The Texas Company, New York, N. Y., a corporation of Delaware Application September 30, 1942, Serial No. 460,198

13 Claims. (Cl. 250—83.6)

This invention relates to a method and an apparatus for logging wells and bore holes and more particularly to a method for determining the nature and location of the various formations or strata traversed by a bore hole by measuring variations in the natural radioactivity of the formations.

The principal object of the invention is to provide a method and equipment by means of which a bore hole can be logged with as great or greater accuracy as is possible with the present radiological methods, and at a speed several times greater than that possible with present equipment. In case extreme accuracy should be required, this method can be used with a logging speed at least as high as that now possible with present methods and apparatus.

It is now well known that the concentration of radioactive substances in the earth varies considerably with changes in the stratigraphy and a close correlation between changes in the strata and the radioactive content has been found. Shales are usually the most radioactive while sandstones and limestones are less active. Measurements of the radioactivity along the bore hole or well, therefore, provide a good method of locating the various strata and distinguishing between adjoining formations. A radioactive logging detector passed through the hole measures the intensity of the gamma rays emitted from the formations, these rays being spontaneously emitted from the decaying radioactive atoms. The penetration power of these rays is relatively great and the absorption by ¼" of steel casing is only about 20%, and it therefore is possible to obtain a good log through the casing in a well; moreover, the influence of the fluid in a well upon the measured intensity is practically negligible. If the annular space between the logging detector and the casing is filled with water or oil, the gamma ray intensity is reduced by only a small percentage. The radiological method therefore is able to produce accurate logs through the casing in wells filled with a fluid, where other logging methods are entirely unsatisfactory.

The speed with which a radioactive log can be taken is limited by the amount of detail or resolution one wishes to obtain. This resolution represents the thinnest stratum that can be identified. In copending applications of D. G. C. Hare, Serial Nos. 364,020 and 412,617, filed November 2, 1940, and September 27, 1941, respectively, two forms of radiation detectors are disclosed which have proven to be many times more sensitive than the ionization chambers and the conventional Geiger-Muller counters. The detector disclosed in application Serial No. 364,020 comprises a plurality of elongated thin cathode plates disposed in slightly separated relation and a plurality of fine anode wires stretched between adjacent pairs of plates. The other detector disclosed in application Serial No. 412,617 comprises a plurality of thin cathode discs disposed in parallel separated relation and arranged in a relatively long column. These discs are provided with several series of holes arranged in alignment and a thin anode wire is disposed so as to coincide with the longitudinal axis of each series. The cathode and anode of each detector is disposed in a suitable casing or envelope containing a gas at a comparatively low pressure and a source of potential of around 1000 volts is applied across the anode and cathode. A gamma ray striking one of the cathode plates may eject an electron into the gas, which electron is accelerated by the electric field from the cathode to the anode to such an extent that it ionizes the gas in the counter. New electrons and ions will thus be formed and these are accelerated by the electric field and in turn produce still additional new ions and electrons. The charge is collected on the anode and produces a comparatively high current pulse of the order of one microampere. These pulses can be amplified easily and fed through the logging cable to the surface.

The detectors described can be made of various lengths ranging anywhere from a few inches to several feet, the longer detectors being naturally more sensitive since they present a greater area to the action of the gamma rays while the shorter detectors, due to their higher resolving power, permit of the accurate logging of very thin formations. It has been demonstrated that with a high efficiency detector of the type described, of about three inches in diameter and five feet in length, a logging velocity of 3000 feet per hour results in a percentage error of 2.5%. When the speed is increased to 6000 feet per hour the error is 3.5%, and this shows that the error actually increases rather slowly with an increase in speed; however, while a detector five feet long will thus produce an accurate log when moving through the hole at a speed of 6000 feet per hour, it will not have a sufficiently high resolving power to determine accurately the location of strata which are much less than five feet in thickness. In order to obtain an accurate indication of a formation, say 15" in thickness, the detector should not be substantially more than 15" in length.

In accordance with the invention a method of bore hole logging has been provided in which a pair of high efficiency radiation detectors disposed in a single housing suspended from a suitable cable are adapted to be passed through the hole to be logged. The pulses from the detectors are conducted upwardly through the cable to a suitable discriminating device at the surface which separates the pulses from the two counters and enables them to be recorded separately. Because of the length of the longer counter the detectors can be passed through the hole at a speed of 6000 feet per hour or higher and an accurate log will be obtained. When the detectors approach a formation thinner than, say, five feet the speed is reduced to around 1000 feet per hour and because of the high resolving power of the shorter detector, an accurate record is made of the nature and location of the thinner formation. The speed is then brought back to at least 6000 feet per hour and the logging continued until another thin formation is reached.

In accordance with a modification, a relay device in the detector housing and connected to the detectors is adapted to be energized from the surface so that the output of either one of the detectors alone will be conducted upwardly to the recorder at the surface; in this case a discriminator is not necessary.

For a better understanding of the invention reference may be had to the accompanying drawings in which:

Figure 2 is a view similar to Figure 1 but showing a modification; while

Figure 3 is a diagrammatic view of the relay shown in Figure 2.

Figure 1:
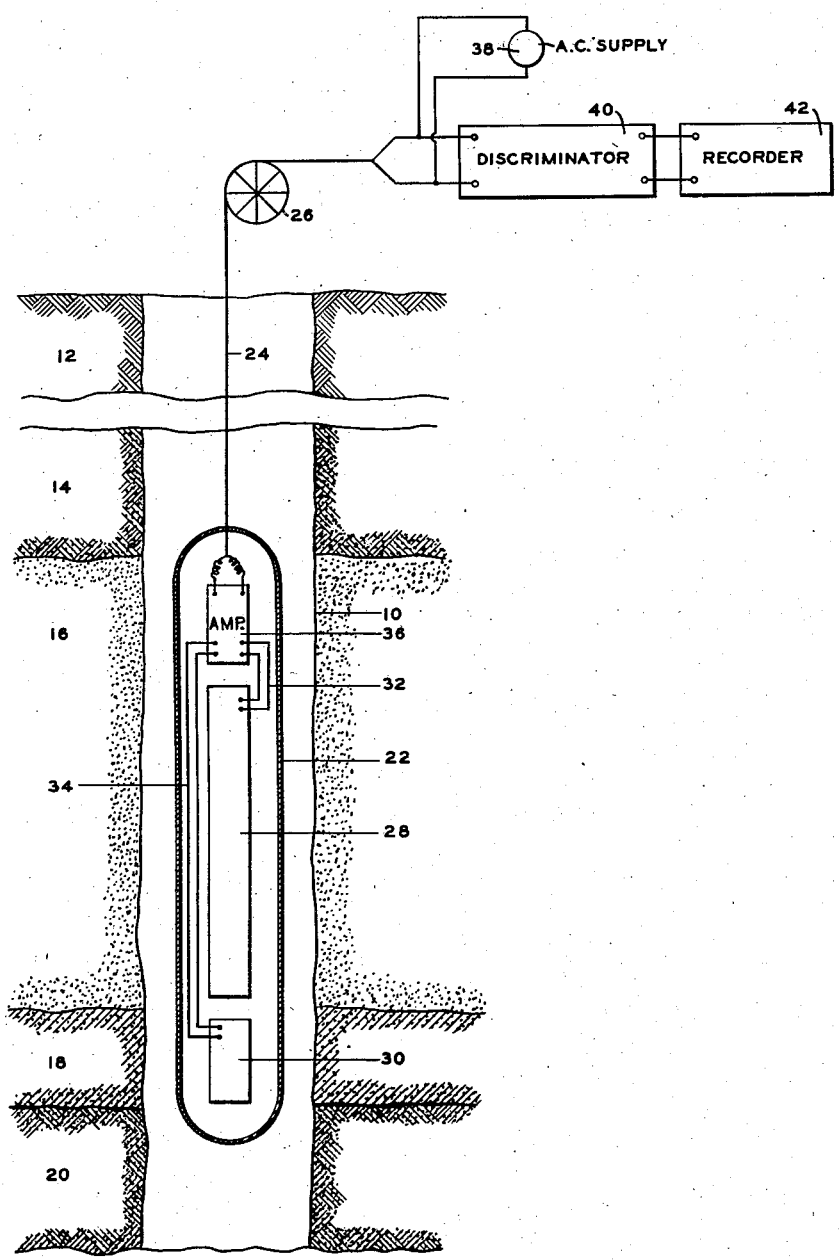
Figure 1 is a vertical sectional elevation through a well or bore hole showing a radiation detecting instrument suspended within the hole.

Referring to the drawings, a bore hole or well 10 is shown as having been drilled through formations or strata such as 12, 14, 16, 18, and 20. For purposes of illustration it is understood that the formation 18 is fairly thin, say, about 15" in thickness and that each of the other formations 12, 14, 16, and 20 is at least three to five feet in thickness.

A housing 22, which may be of any suitable material and construction, is adapted to be lowered and raised through the hole by means of a cable 24 passing over a measuring device 26. Within the housing 22 are disposed a pair of elongated radiation detectors 28 and 30 sensitive to gamma radiation and preferably of a type such as it disclosed in the aforementioned pending application of D. G. C. Hare, Serial No. 412,617. The detector 28 is preferably about five feet in length and the detector 30 has a length of about 15". These dimensions are by way of example and correspond to the dimensions of an instrument which has been used in actual service in accordance with the invention described herein. The detectors may be of other lengths, but it is preferred that the shorter detector be about one-third as long as the longer detector and of a length substantially equal to the thickness of the thinnest stratum to be logged.

The output of the two detectors 28 and 30 is conducted by wires 32 and 34 to a vacuum tube amplifier 36 also disposed within the housing 22. The device 36 serves to amplify the pulses of the detectors 28 and 30 and also to supply the high voltage necessary for the detectors. The cable 24 is of the one-conductor type by means of which electrical current from a suitable source 38 is conducted downwardly to amplifier 36. The amplifier 36 may be of any suitable kind, for example the type disclosed in the copending application of D. G. C. Hare, Serial No. 415,196 filed October 16, 1941, in which the pulses from the detectors 28 and 30 serve to modulate carrier current frequencies generated by oscillators within the amplifier, these modulated carriers then being conducted upwardly through the cable 24 to a suitable filter or discriminator 40, the output of which is conducted to a device 42 capable of recording separately the outputs of the two detectors. With such an arrangement, a one-conductor cable 24 is sufficient to carry the alternating current necessary to energize the vacuum tubes of the amplifier 36 and the detectors 28 and 30 and also for conducting upwardly to the discriminator 40 the modulated output currents of the two detectors.

In operation, the housing 22 is lowered and raised through the hole 10 and the variations in the amount of radiation emitted by the formations traversed by the hole will be recorded by means of the device 42 while the depth of the instrument in the hole will be indicated by means of the cable measuring device 26. While passing through most of the formations, such as those indicated as 12, 14, and 16, the instrument will be moved at a speed of around 6000 feet per hour since, as has been described hereinbefore, the length of the detector 28 will permit an accurate record or log to be obtained at that speed. When approaching a thin formation, such as that indicated at 18, the speed of movement of the instrument through the hole will be decreased to about 1000 feet per hour, and, because of the high resolving power of the shorter detector 30, the exact boundaries of the formation 18 will be recorded.

On the passing beyond the formation 18 the speed will again be brought back to about 6000 feet per hour. With this arrangement two records or logs will be made simultaneously, one corresponding to the output response of the longer detector 28 and the other corresponding to the output response of the shorter detector 30. The record corresponding to the response of the detector 28 will be sufficiently accurate to define the nature and location of all strata having thicknesses equal to or greater than the length of that detector, and the shorter detector 30 will provide an accurate record of the thinner strata. In case no previous log or information is available with regard to the strata traversed by the hole, the instrument 22 may be passed through the hole once to obtain a general log and again may be passed through the hole at the speed of 6000 feet per hour and slowed down to 1000 feet per hour at the depths indicated by the previously obtained record as corresponding generally to the location of thin strata, such as the formation 18. Since in an average bore hole there will not be many formations traversed having thicknesses of the order of one to two feet, it will not be necessary to slow the movement of the instrument to a speed of 1000 feet per hour many times. Moreover, it will naturally require but very little time for the instrument to pass through the thin formations and consequently an ordinary bore hole can be logged at an average speed of substantially 6000 feet per hour.

Figures 2, 3:
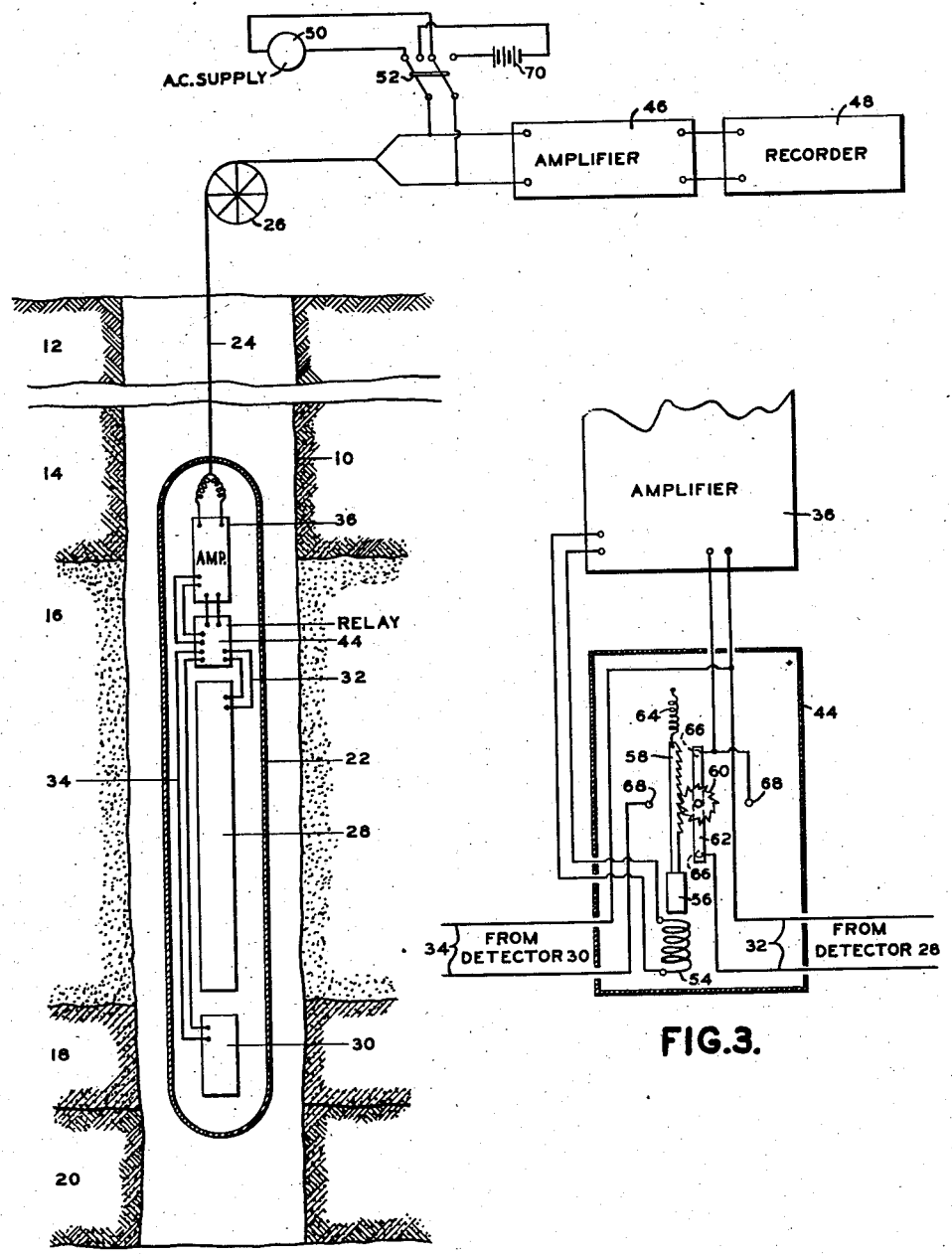

In Figure 2 of the drawings a modification is disclosed in which elements corresponding to those shown in Figure 1 are indicated with the same reference characters. As shown in Figure 2, the outputs of the detectors 28 and 30, instead of being conducted directly to the amplifier-oscillator 36, are led to a relay device 44 shown more clearly in Figure 3, this relay being connected in turn to the amplifier 36. Instead of the outputs of both detectors 28 and 30 being conducted to the surface simultaneously through the cable 24, the relay 44, as shown in the modification of Figure 2, when actuated from the surface will connect either one or the other of the detectors 28 and 30 to the amplifier 36. In this manner only one record or log will be made but this log will correspond in some instances to the output of the longer detector 28 and in others to the output of the shorter detector 30. The upper end of the cable 24 is shown as connected to a second amplifier 46 which in turn is connected to a recorder 48. A source of alternating current supply 50 is normally connected to the cable 24 through the double-pole, double-throw switch 52 so that current will be supplied to the instrument in the hole for operating the vacuum tubes of the amplifier-oscillator 36 and for supplying necessary potential to the detectors 28 and 30. The relay 44 may be of any suitable type and is shown in Figure 3 as comprising a magnet or solenoid coil 54 and an armature 56 connected to a rack 58 and a pinion 60 which turns a rotatable bar 62 counterclockwise through a 90° arch each time the coil 54 is engaged. The rack 58 is biased toward its upper position by means of the tension spring 64. Two pairs of oppositely disposed contacts 66 and 68 are adapted to be selectively engaged by the bar 62 to connect one or the other of the detectors 28 and 30 to the amplifier 36. The illustration of the switch 62 is somewhat diagrammatic and it is understood that on the upstroke the rack 58 will slip over the teeth of the pinion 60, the bar 62 being prevented, as by friction, from turning in a clockwise direction. As shown in Figure 3, the circuit is completed from the detector 28 through the contacts 66 to the amplifier 36; when, however, the coil 54 is energized, the armature 56 will be pulled down to rotate the bar 62 to engage contacts 68 to establish the circuit between the detector 30 and the amplifier 36 and to break the circuit from the other detector. In order to energize the relay 44, a source of direct current 70 is shown in Figure 2 connected to the switch 52 so that when the switch is moved toward the right a direct current impulse will be passed downwardly through the cable and the amplifier 36 to the energizing coil 54 of the relay.

The general operation of the apparatus shown in Figures 2 and 3 is substantially the same as that described with reference to Figure 1; however, as stated above, the record of the response of but one of the two detectors 28 and 30 will be made at any one time. Assuming the instrument 22 is being raised through the hole and is at a position just below that shown in Figure 2, the detector 28 will then be connected through the relay 44, as is shown in Figure 3, to the amplifier 36 and then through the cable 24 and the other amplifier 46 to the recorder 48 which will log the variations in the formation traversed. Upon approaching the formation 18 from below, the switch 52 will be moved quickly to its right-hand position and then back again whereupon a direct current impulse through the cable 24 will cause the relay coil 54 to turn the switch bar 62 counter-clockwise to connect the shorter detector 30 to the amplifier 36. The response of the shorter detector 30 will, therefore, be recorded until that detector has passed above the formation 18 at which time the switch 52 will again be moved to the right so as to energize the relay coil 54 to turn the switch bar 62 to engage contacts 66 so that the longer detector 28 will again be connected to the recorder 48. It will be seen that in accordance with this modification applicant has provided a very simple means for selecting one or the other of the detectors so that it will be unnecessary to make a simultaneous record of the output response of both detectors. As stated above, aside from the provision for selecting one or the other of the detectors, the operation of the apparatus shown in Figure 2 is the same as that described with reference to Figure 1. Thus, the instrument will be moved through the hole at a high speed of around 6000 feet per hour when a record is being made of the output of the longer detector 28 and a lower speed of about 1000 feet per hour while a record is made of the boundaries of the thin strata by means of the shorter detector 30.

Although two separate detectors 28 and 30 have been described, it is to be understood that these detectors may be made up as one unit; that is, with the cathodes and anodes of both detectors disposed end to end in one elongated case or housing, the cathode and anode of each detector being connected separately to the amplifier 36. If desired, the combined output of the detectors 28 and 30 can be recorded while logging at the higher speed, and the output of the short detector 30 alone recorded while logging the thin strata.

Obviously many modifications and variations of the invention as hereinbefore set forth may be made without departing from the spirit and scope thereof and, therefore, only such limitations should be imposed as are indicated in the appended claims.

I claim:

1. A method of logging a bore hole which comprises passing through said hole a pair of vertically elongated radiation detectors of different lengths, the shorter of said detectors being substantially as long as the vertical dimension of the thinnest stratum to be logged, moving said detectors through the hole at a slower rate when traversing the thinner strata than when traversing the thicker strata, and recording the output of said detectors as they are moved through the hole.

2. A method of logging a well which comprises passing through said well an instrument containing a pair of vertically elongated radiation detectors of different lengths, moving said instrument at a rapid rate through those portions of the bore which traverse strata of greater thickness than the length of the longer detector, moving said housing at a slower rate through those formations thinner than the length of the longer detector, and recording at the surface the output of the two detectors.

3. A method of logging a bore hole which comprises moving through said hole a pair of vertically elongated radiation detectors of different lengths, the shorter of said detectors being substantially as long as the vertical dimension of the thinnest stratum to be logged, recording the output of the shorter detector while the detectors are moving through the hole in the vicinity of a thin stratum, and recording the output of the longer detector while the detectors are moving through other portions of the hole.

4. A method of logging a bore hole which comprises moving through said hole a pair of vertically elongated radiation detectors of different lengths and of the Geiger-Muller counter type, the shorter of said detectors being substantially as long as the vertical dimension of the thinnest stratum to be logged and the longer detector being substantially three times as long as the shorter detector, recording the output of the shorter detector while said housing is moving through the hole in the vicinity of a thin stratum, and recording the output of the longer detector while the housing is moving through other portions of the hole.

5. A method of logging a bore hole which comprises moving through said hole an instrument containing a pair of vertically elongated radiation detectors of different lengths, the shorter of said detectors being substantially as long as the vertical dimension of the thinnest stratum to be logged, recording the output of the shorter detector while said instrument is moving through the hole in the vicinity of a thin stratum at a comparatively slow speed, and recording the output of the longer detector while the instrument is moving through other portions of the hole at a higher speed whereby the thin and the thick strata will be logged with substantially the same accuracy.

6. A method of logging a bore hole which comprises moving through said hole a unit comprising a pair of vertically elongated radiation detectors of different lengths, the shorter of said detectors being substantially as long as the vertical dimension of the thinnest stratum to be logged, recording the output of the shorter detector while the detectors are moving through the hole in the vicinity of a thin stratum at a speed of about 1000 feet per hour, and recording the output of the longer detector while the detectors are moving through other portions of the hole at a speed of from 4000 to 7000 feet per hour, whereby the thin strata will be logged with as great an accuracy as the thicker strata.

7. A method of logging a bore hole traversing strata of different thicknesses which comprises passing through said hole a vertically elongated radiation detecting device capable of detecting the natural radioactivity of said strata, said device comprising a major detecting portion and a minor detecting portion, moving said device at a speed of approximately 1000 feet per hour past strata of from one to five feet in thickness while recording the output of the minor portion of the device, and moving the device past strata of different thicknesses at a speed of 4000 to 7000 feet per hour while recording the output of the major portion of the device.

8. A method of logging a bore hole traversing strata of different thicknesses which comprises passing through said hole a vertically elongated radiation detecting device having a major detecting portion and a minor detecting portion, detecting the natural radioactivity of the thicker strata at a speed of from 4000 to 7000 feet per hour while recording the output of the major portion of the device and detecting the natural radioactivity of the thinner strata of from one to five feet in thickness at a speed of approximately one thousand feet per hour while recording the output of the minor portion of the device, whereby the thinner and the thicker strata will be logged with substantially the same degree of accuracy.

9. The method of making an accurate radiological log of a bore hole which comprises passing through said hole a device including two sensitive radiation detectors of the Geiger-Muller counter type, said detectors being of substantially different lengths, moving said device at a speed of approximately 1000 feet per hour while formations varying from one to five feet in thickness are being traversed while recording the response of the shorter of said detectors and moving said device at a speed of at least 6000 feet per hour while traversing formations greater than five feet in thickness while recording the response of the longer detector.

10. The method of making an accurate radiological log of a bore hole which comprises passing through said hole a device including two sensitive radiation detectors of the Geiger-Muller counter type, the shorter of said detectors being substantially one foot in length and the longer detector being substantially five feet in length, moving said device at a speed of approximately 1000 feet per hour while formations varying from one to five feet in thickness are being traversed while recording the response of the shorter of said detectors and moving said device at a speed of at least 6000 feet per hour while traversing formations greater than five feet in thickness while recording the response of the longer detector.

11. An apparatus for making a radiological log of the formations traversed by a bore hole, which comprises a housing suspended in said hole by means of a one-conductor cable, a pair of elongated radiation detectors of substantially different lengths disposed in said housing, means in said housing adapted to connect either of said detectors to said cable, the shorter of said detectors being substantially as long as the vertical dimension of the thinnest stratum to be logged, filtering and recording means at the surface connected to said cable for separately recording the output signals from said detectors, a source of potential at the surface connected to said cable for supplying potential to said detectors, means at the surface for actuating said connecting means, and means for lowering and raising said housing in said hole so that said detectors will be exposed to radiation emitted from said formations.

12. An apparatus for making a radiological log of the formations traversed by a bore hole, which comprises a housing suspended in said hole by means of a one-conductor cable, a pair of elongated radiation detectors of substantially different lengths disposed in said housing, the shorter of said detectors being substantially as long as the vertical dimension of the thinnest stratum to be logged, means in said housing for amplifying the output of said detectors, said amplifying means being connected to said cable, a relay connected between said detectors and said amplifying means and adapted when energized to connect a predetermined one of said detectors to said amplifying means, recording means at the surface connected to said cable for recording the output signals from said detectors, a source of electrical current at the surface connected to said cable for supplying potential to said detectors, means at the surface for energizing said relay, and means for lowering and raising said housing in said hole so that said detectors will be exposed to radiation emitted from said formations.

13. An apparatus for making a radiological log of the formations traversed by a bore hole, which comprises a housing suspended in said hole by means of a one-conductor cable, a pair of elongated radiation detectors of the Geiger-Müller counter type and of substantially different lengths disposed in said housing, the shorter of said detectors being substantially as long as the vertical dimension of the thinnest stratum to be logged, means in said housing for amplifying the output of said detectors, said amplifying means being connected to said cable, a relay connected between said detectors and said amplifying means and adapted when energized to connect a predetermined one of said detectors to said amplifying means, recording means at the surface connected to said cable for recording the output signals from said detectors, a source of alternating current at the surface connected to said cable for supplying potential to said detectors, means at the surface for energizing said relay comprising a source of direct current connected to said cable and a two-position switch in the connections between said direct current source, said alternating current source and said cable adapted when in one position to connect said alternating current to said cable and when in the other position to connect said direct current to said cable to energize said relay, and means for lowering and raising said housing in said hole so that said detectors will be exposed to radiation emitted from said formations.

GERHARD HERZOG.